United States Patent Office 3,644,487
Patented Feb. 22, 1972

3,644,487
SULFUR YLID PRODUCTION
George B. Payne, Berkeley, Calif., assignor to Shell
Oil Company, New York, N.Y.
No Drawing. Filed May 19, 1966, Ser. No. 551,233
Int. Cl. C07c 69/52
U.S. Cl. 260—481                    9 Claims

ABSTRACT OF THE DISCLOSURE

Method of producing sulfur ylids by contacting a sulfonium halide of the formula

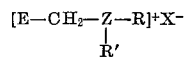

wherein X⁻ is a halide ion, R and R' independently are lower alkyl and E is a carbalkoxy group with a dehydrohalogenating solution comprising an aqueous solution of a mixture of alkali metal hydroxide and alkali metal carbonate at a temperature of from about −10° C. to about 50° C.

---

This invention relates to an improved method for the production of certain sulfur ylids and to novel sulfur ylids thereby produced.

In general, sulfur ylids are characterized by the presence within the molecular structure of a moiety represented by the following resonance forms.

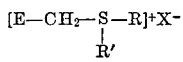

Methods are available in the art for the production of sulfur ylids under conditions whereby the ylid formed is substantially immediately reacted with an organic reactant to form a desired product. Thus, the methods heretofore available are characterized as in situ productions of ylids and do not allow separation of the ylid from the medium of its production or isolation and characterization of the ylid product. A typical procedure comprises reacting a sulfonium halide with a strong base, e.g., alkali metal or alkali metal hydride, under absolutely anhydrous conditions to effect dehydrohalogenation of the sulfonium halide to the ylid. For example, Speziale et al., J. Am. Chem. Soc. 87, 3460 (1965), produce a variety of ylids in situ by reaction of sulfonium halides with sodium hydride in ether solution, which ylids are subsequently reacted with Schiff's bases. It is characteristic of this publication as well as of others that the presence of water is to be avoided in the production of sulfur ylids and that sulfur ylids sufficiently reactive to be useful in further applications are considered to be incapable of isolation.

It is an object of the present invention to provide an improved method for the production of certain stabilized sulfur ylids. It is an additional object to provide certain novel, isolable sulfur ylids.

It has now been found that these objects are accomplished by the process of intimately contacting (a) a concentrated aqueous solution comprising alkali metal carbonate and alkali metal hydroxide and (b) a (substituted-methyl)dialkylsulfonium halide wherein the methyl substituent is an electron-withdrawing group. The ylid products are apparently stabilized by the neighboring electron-withdrawing group and at least in part as a result thereof exhibit relatively long lifetimes which in some instances are sufficient to permit the isolation and characterization of the sulfur ylid product.

Broadly speaking, the sulfonium halide reactants comprise a positively charged sulfur atom to which is bonded two alkyl substituents and a methyl moiety additionally substituted with an electron withdrawing group, which sulfur atom is further associated in an ionic manner with the halide anion. One class of such sulfonium halide reactants comprises those of up to 15 carbon atoms and represented by the formula

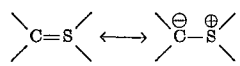

wherein X⁻ is a halide anion, R and R' independently are lower alkyl and E is an electron-withdrawing group. By the term "electron-withdrawing" group as employed herein meant a multi-atom functional group which, when attached to an aromatic ring, is considered to be meta-directing and ring-deactivating, as illustrated by groups such as acyl, formyl, carboxy, sulfonyl, nitro, carbamyl, cyano, carbalkoxy and acyloxy. Preferred electron-withdrawing groups, however, are free from active hydrogen atoms and aliphatic unsaturation and comprises an atom of carbon by means of which the electron-withdrawing group is linked to the remaining moiety of the sulfonium halide reactant and is additionally multiple bonded to an atom of atomic number from 7 to 8 inclusive, i.e., nitrogen or oxygen. Representative of such preferred electron-withdrawing groups are cyano, carbalkoxy, carbaryloxy, alkanoyl, aryloyl and N,N-dialkylcarbamyl.

In the above formula, R and R' independently are lower alkyl, preferably alkyl of up to 4 carbon atoms, e.g., methyl, ethyl, propyl, isopropyl, butyl, sec-butyl or isobutyl. In part because of the desirable properties of the ylids produced therefrom, the preferred sulfonium halides are those wherein each of R and R' are methyl.

The X⁻ portion of the sulfonium halide reactant is an anion derived from a halogen atom and sulfonium halides wherein the halide is fluoride, chloride, bromide or iodide are satisfactory. Preferred, however, are sulfonium halides wherein the halogen is halogen of atomic number from 17 to 53 inclusive, i.e., chlorine, bromine or iodine, and particularly preferred as sulfonium halide reactants are sulfonium bromides.

Exemplary sulfonium halides of the above formula are carbethoxymethyldimethylsulfonium bromide, dimethylphenacylsulfonium bromide, cyanomethyldiethylsulfonium chloride, carbomethoxymethyldipropylsulfonium iodide, acetonyldimethylsulfonium bromide (N,N-dimethylcarbamylmethyl)diethylsulfonium chloride, carbophenoxymethyldimethylsulfonium bromide, cyanomethyldimethylsulfonium bromide, carbethoxymethyldimethylsulfonium chloride and carbopropoxymethyldipropylsulfonium iodide. The sulfonium halide salts are prepared in conventional manner by reaction of a dialkyl sulfide and the corresponding E—CH₂X reactant wherein E and X have the previously stated significance. For example, reaction of ethyl bromoacetate with dimethyl sulfide results in the production of carbethoxymethyldimethylsulfonium bromide.

The above-identified sulfonium halides are dehydrohalogenated to the corresponding ylid according to the process of the invention by intimately contacting the sulfonium halide with a concentrated aqueous solution of alkali metal carbonate and alkali metal hydroxide. Utilization of carbonates and hydroxides of any particular alkali metal is not critical, and carbonates and hydroxides of lithium, sodium, potassium, rubidium or cesium are satisfactorily utilized, although best results are obtained when the alkali metal is other than lithium. Preferred, however, largely because of the availability thereof, are hydroxides and carbonates of sodium or potassium. The combination of potassium carbonate and sodium hydroxide comprises a particularly preferred modification.

The precise ratio of alkali metal carbonate to alkali metal hydroxide is not critical, except insofar as it relates to the ratio of alkali metal hydroxide to sulfonium halide reactant and the concentration of the alkali metal compounds in the dehydrohalogenating solution. It is desirable that at least about one mole of alkali metal hydroxide be present for each mole of the sulfonium halide salt. Molar ratios of alkali metal hydroxide to sulfonium halide from about 1:1 to about 3:1 are useful, although molar ratios from about 1:1 to about 1.5:1 are preferred and good results are customarily obtained when a substantially stoichiometric ratio of alkali metal hydroxide to sulfonium halide is utilized, that is, a molar ratio that is substantially 1:1. The alkali metal carbonate is employed in molar amounts equal to or greater than the molar amount of alkali metal hydroxide, e.g., a molar ratio from about 1:1 to about 20:1. Of greater criticality, however, is the consideration that the alkali metal carbonate should be employed in an amount sufficient to essentially saturate the aqueous solution of carbonate and hydroxide. The amount of alkali metal carbonate required to essentially saturate the aqueous solution, e.g., required to afford a solution at least 90%, preferably at least 95%, of saturation will depend upon a number of factors, particularly the amount of water present and the temperature at which dehydrohalogenation of the sulfonium bromide is to be effected. Methods for determining the extent of saturation as well as the point at which the solution becomes essentially saturated are conventional and are well known in the art. A preferred modification of providing the dehydrohalogenating solution comprises forming a saturated solution of the alkali metal carbonate and adding thereto a concentrated solution of alkali metal hydroxide, e.g., a solution of a concentration of at least 9 N, containing sufficient alkali metal hydroxide to provide from about 1 mole to about 3 moles of alkali metal hydroxide for each mole of sulfonium halide with which the dehydrohalogenating solution is to be contacted.

Generically speaking, the sulfonium halide is intimately contacted with an aqueous solution comprising from 1 to 3 mole of alkali metal hydroxide per mole of sulfonium halide and sufficient alkali metal carbonate to essentially saturate the solution, the amount of alkali metal carbonate being at least equimolar with the amount of alkali metal hydroxide. The method of contacting is not material, and conventional methods of achieving intimate contact of such materials are satisfactory.

The dehydrohalogenation solution and the sulfonium halide are contacted at a relatively low temperature. Temperatures from about —10° C. to about 50° C. are satisfactory with the reaction temperature range from about 0° C. to about 25° C. being preferred. The reaction pressure is not critical provided that the reaction mixture is maintained in a non-gaseous state. Pressures that are substantially atmospheric, e.g., from about 0.5 atmosphere to about 5 atmospheres are satisfactory.

During the course of the reaction, the ylid product separates from the aqueous reaction medium, presumably because of the presence therein of quantities of inorganic compounds having a substantially greater solubility in the aqueous medium. The ylid product is separated from the remainder of the product mixture by conventional methods of phase separation, e.g., filtration, decantation or the like. The preferred method of effecting ylid product removal comprises a process of selective extraction employing a selective extraction solvent capable of dissolving the ylid product but a solvent in which water or inorganic salts exhibit little solubility. Suitable selective extraction solvents are liquid at reaction temperature and are inert to the components of the reaction mixture and the products produced therefrom. Illustrative of such solvents are hydrocarbons free from aliphatic unsaturation such as pentane, hexane, isooctane, cyclohexane, tetrahydronaphthalene, benzene, toluene, and xylene, and halogenated hydrocarbons such as methylene chloride, chloroform, carbon tetrachloride, hexachloroethane and methylene bromide. In a preferred modification of the selective extraction procedure, the selective extraction solvent is present during the production of ylid by reaction of the sulfonium halide and the dehydrohalogenation solution. In this modification, separation of the ylid from the medium of its formation is facilitated by the presence of the selective extraction solvent which serves to effect extraction of the ylid as it is produced.

The ylid product, in terms of the preferred sulfonium halides as above defined, is represented by the formula

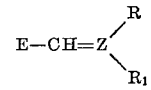

wherein E, R and R' have the previously stated significance. It should be appreciated that the ylid molecule is the hybrid of several resonance structures involving polarization of the carbon-sulfur multiple bond and possible delocalization of any negative charge on the carbon atom thereof by the neighboring electron-withdrawing group, and that as a result no single simple structure adequately described the ylid molecule. For convenience, however, the ylid is described herein in terms of the above-depicted formula which represents one contributing structure.

A variety of system of nomenclature are applicable to the naming of the ylid products of the invention. As employed herein, the term "dialylthioxo" is representative of the =SRR' moiety. Thus representative ylids include 2 - (dimethylthioxo)acetophenone, ethyl (dimethylthioxo)acetate, methyl (dipropylthioxo)acetate, (dimethylthioxo)acetonitrile, N,N - diethyl(diethylthioxo)acetamide, phenyl (dimethylthioxo)acetate, α - (dimethylthioxo)acetone and (diethylthioxo) acetonitrile. Each ylid product exhibits sufficient stability to permit separation from the medium of its production as by selective extraction and subsequent utilization of the ylid, at least in the form of the resulting extract. A special case exists, however, when the E term of the above ylid formula is acyl, e.g., alkanoyl or aryloyl, or carbohydrocarbonoxy, e.g., carbalkoxy or carbaryloxy. In these instances, the ylid product although reactive, is sufficiently stable to permit facile isolation and characterization of the ylid provided that excessively high temperatures are not employed in the ylid isolation. Isolation of the ylid is effected by conventional means, but in a preferred modification the ylid is selectively extracted from the medium of its formation and subsequently the extraction solvent is removed as by distillation at reduced pressure and temperatures of about 50° C. or lower. The ylid is obtained as an essentially pure bottoms product.

The ylid products of the invention are useful as chemical intermediates in a variety of applications. A principal utility resides in the formation of cyclopropane derivatives by reaction of the ylid with an activated olefinic compound. For example, reaction of ethyl dimethylthioxoacetate with diethyl maleate results in the production of 1,2,3-tris(carbethoxy)cyclopropane which is hydrolyzed to the corresponding tribasic acid which is useful as a curing agent for epoxy compounds, imparting strength to the resulting epoxy resin product because of the closely-knit polyfunctional character of the 1,2,3-tricarboxycyclopropane curing agent. Other similar applications of the ylid products of the invention are disclosed in greater detail and are claimed in applicant's copending U.S. application Ser. No. 551,212, filed of even date, now U.S. Pat. 3,397,223.

To further illustrate the process of the invention and the novel ylid products thereof, the following examples are provided. It should be understood that the details thereof are not to be regarded as limitations as they may be varied as will be understood by one skilled in this art.

EXAMPLE I

A solution of 265 g. of ethyl bromoacetate and 114 g. of dimethyl sulfide in 500 ml. of acetone was stored in a tap water bath for three days. Filtration of the resulting product mixture gave 326 g. of 90% yield, of carbethoxymethyldimethylsulfonium bromide, M.P. 78–80° C. with decomposition.

A solution of 163 g. of carbethoxymethyldimethylsulfonium bromide in 565 ml. of chloroform was stirred vigorously at 5–10° C. with a mixture of 425 ml. of saturated potassium carbonate and 56.6 ml. of 12.5 N. sodium hydroxide. The reaction mixture was maintained at 18–20° C. for 20 minutes and then filtered to remove insolubles. The filtrate was separated and the upper chloroform layer was dried for 2 hours over potassium carbonate. Removal of the chloroform under vacuum at room temperature and 1 mm. gave 100 g., a 95% yield, of ethyl (dimethylthioxo)acetate, a pale yellow product; $n_D^{25}$ 1.5253–1.5263. The ylid product had the following analysis.

*Analysis.*—Calcd. (percent wt.): C, 48.6; H, 8.2; S, 21.6. Found (percent wt.): C, 48.6, 48.7; H, 8.1, 8.1; S, 21.8.

The infrared, ultraviolet and nuclear magnetic resonance spectra of the product were consistent with the above structure.

EXAMPLE II

To a 300 ml. autoclave was charged 37 g. of ethyl chloroacetate, 25 g. of dimethyl sulfide, 70 ml. of methanol and 30 ml. of water. The mixture was flushed with nitrogen and heated with stirring at 80° C. for 3 hours. The cooled product mixture was stabilized at 30° C. and 1 mm. to give 40 g., a 72% yield, of carbethoxymethyldimethylsulfonium chloride as a greenish viscous oil.

The dehydrohalogenation of the sulfonium chloride was conducted according to the procedure of Example I. The yield of ethyl (dimethylthioxo)acetate was 61%. The identity of the product was established by comparison of the infrared spectrum thereof with that of the product of Example I.

EXAMPLE III

A mixture of 100 g. of phenacyl bromide and 47 g. of dimethyl sulfide in 200 ml. of acetone was stored overnight in a tap water bath. Filtration of the resulting mixture afforded 129 g., a 98% yield, of phenacyldimethylsulfonium bromide, M.P. 142° C. with decomposition.

When a solution of phenacyldimethylsulfonium bromide in chloroform is contacted with a saturated solution of potassium carbonate containing 1 equivalent of potassium hydroxide according to the procedure of Example I, a good yeild of 2-(dimethylthioxo)acetophenone is obtained. The product 2 - (dimethylthioxo)acetophenone, when anhydrous, is a solid with a melting point of 76–78° C. The infrared and nuclear magnetic resonance spectra of 2-(dimethylthioxo)acetophenone are consistent with that structure. The ylid product, upon exposure to the atmosphere, formed a dihydrate having a melting point of 55–57° C. When the hydrate was dissolved in chloroform and the solution was dried over magnesium sulfate, filtration and solvent removal afforded again the anhydrous ylid, M.P. 76–78° C.

EXAMPLE IV

To 45.8 g. of iodoacetonitrile in 20 ml. of benzene was added 13.6 g. of dimethylsulfide and the mixture was allowed to stand for 136 hours. The product mixture was filtered, washed with benzene and dried under vacuum. The yield of cyanomethyldimethylsulfonium iodide, M.P. 99–107° C. with decomposition, was 74%.

To a stirred solution of 22.9 g. of cyanomethyldimethylsulfonium iodide in 100 ml. of chloroform was added 70 ml. of a saturated solution of potassium carbonate and 9 ml. of 11 N sodium hydroxide which had been cooled below 5° C. The resulting mixture was stirred for 20 minutes at a temperature below 5° C. and then filtered. The chloroform phase was removed and dried over magnesium sulfate in the cold and the resulting solution was found to contain (dimethylthioxo)acetonitrile.

I claim as my invention:

1. The process of producing sulfur ylids by intimately contacting (a) the sulfonium halide of the formula

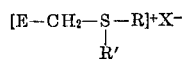

wherein X⁻ is a halide anion, R and R' independently are lower alkyl selected from the group consisting of methyl, ethyl, and propyl, and E is a carbalkoxy group selected from the group consisting of carbomethoxy, carbethoxy, and carbopropoxy, with (b) a dehydrohalogenating solution comprising an aqueous solution of from about 1 mole to about 3 moles of alkali metal hydroxide per mole of said sulfonium halide and an amount of alkali metal carbonate sufficient to essentially saturate said aqueous solution, said amount of alkali metal carbonate being at least one mole of alkali metal carbonate for each mole of alkali metal hydroxide, at a temperature from about −10° C. to about 50° C.

2. The process of claim 1 wherein said halide is halogen of atomic number from 17 to 53 inclusive.

3. The process of claim 2 wherein the halide is bromide.

4. The process of claim 2 wherein R and R' are each methyl.

5. The process of claim 4 wherein the alkali metal of said alkali metal carbonate and of said alkali metal hydroxide is sodium or potassium.

6. The process of claim 5 wherein the sulfonium halide is carbethoxymethyldimethylsulfonium bromide.

7. The process of claim 2 wherein said intimate contacting is conducted in the presence of a selective extraction solvent, thereby continuously selectively extracting said ylid from the resulting product mixture, and the resulting extract is separated from the resulting raffinate.

8. The process of claim 7 wherein the selective extraction solvent is a halogenated hydrocarbon.

9. The process of claim 8 wherein the selective extraction solvent is chloroform.

References Cited

UNITED STATES PATENTS 3,355,351    11/1967    Ratts _____ 424—324

OTHER REFERENCES

Speziale et al.: J. Am. Chem. Soc. 87, pp. 3460–3462 (1969).

DANIEL D. HORWITZ, Primary Examiner

U.S. Cl. X.R.

260—461 S, 465.1, 592, 593 R, 607 R